United States Patent
Wu

(10) Patent No.: US 9,514,692 B2
(45) Date of Patent: Dec. 6, 2016

(54) DISPLAY DEVICE AND SWITCHING METHOD OF ITS DISPLAY MODES

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 260 days.

(21) Appl. No.: 14/362,078

(22) PCT Filed: Dec. 20, 2013

(86) PCT No.: PCT/CN2013/090080
§ 371 (c)(1),
(2) Date: May 30, 2014

(87) PCT Pub. No.: WO2014/190741
PCT Pub. Date: Dec. 4, 2014

(65) Prior Publication Data
US 2015/0269893 A1    Sep. 24, 2015

(30) Foreign Application Priority Data

May 31, 2013  (CN) .......................... 2013 1 0213502

(51) Int. Cl.
*G09G 3/36*    (2006.01)
*G02B 27/22*    (2006.01)
(Continued)

(52) U.S. Cl.
CPC ............ *G09G 3/36* (2013.01); *G02B 27/2214* (2013.01); *G09G 3/003* (2013.01); *G09G 3/3659* (2013.01);
(Continued)

(58) Field of Classification Search
None
See application file for complete search history.

(56) References Cited

U.S. PATENT DOCUMENTS 5,161,237 A * 11/1992 Hartman ............... G02F 1/1365
349/34
2005/0111100 A1* 5/2005 Mather ................. G02F 1/1323
359/464
(Continued)

FOREIGN PATENT DOCUMENTS

CN    102213859 A    10/2011
CN    102385198 A    3/2012
(Continued)

OTHER PUBLICATIONS

International Preliminary Report on Patentability Appln. No. PCT/CN2013/090080; Dated Dec. 1, 2015.
(Continued)

*Primary Examiner* — Ryan Crockett
(74) *Attorney, Agent, or Firm* — Ladas & Parry LLP

(57) ABSTRACT

A display device and a switching method of its display modes are provided. The display device comprises: a display panel (1), configured to display an image; a slit grating (2), on a light exiting side of the display panel (1); and a liquid crystal lens (3), on a light exiting side of the slit grating (2) to realize three effects of a concave lens effect, a convex lens effect and a flat light-transmitting glass effect.

28 Claims, 5 Drawing Sheets

(51) Int. Cl.
    *H04N 13/04*     (2006.01)
    *G09G 3/00*     (2006.01)
    *G09G 3/38*     (2006.01)

(52) U.S. Cl.
    CPC ............ *G09G 3/38* (2013.01); *H04N 13/0404* (2013.01); *H04N 13/045* (2013.01); *H04N 13/0411* (2013.01); *G09G 2320/068* (2013.01); *G09G 2320/0613* (2013.01); *H04N 2013/0465* (2013.01)

(56) References Cited

U.S. PATENT DOCUMENTS

| | | | | |
|---|---|---|---|---|
| 2007/0139584 A1* | 6/2007 | Jin | ........................ | G02F 1/1323 349/74 |
| 2008/0158449 A1* | 7/2008 | Daverman | ........ | G02F 1/133345 349/33 |
| 2009/0033812 A1* | 2/2009 | Ijzerman | ............ | G02B 27/2214 349/15 |
| 2011/0157171 A1* | 6/2011 | Lin | .................... | H04N 13/0413 345/419 |
| 2011/0157339 A1* | 6/2011 | Bennett | ..................... | G06F 3/14 348/59 |
| 2011/0242442 A1 | 10/2011 | Lee et al. | | |
| 2012/0057229 A1* | 3/2012 | Kikuchi | ................. | G02B 5/201 359/463 |
| 2012/0229429 A1* | 9/2012 | Inoue | ................. | G02B 27/2214 345/204 |
| 2012/0257127 A1* | 10/2012 | Miyazawa | .......... | G02F 1/13471 349/15 |
| 2014/0192298 A1* | 7/2014 | Sumiyoshi | ........ | G02F 1/134336 349/96 |

FOREIGN PATENT DOCUMENTS

| | | |
|---|---|---|
| CN | 102707539 A | 10/2012 |
| CN | 103293689 A | 9/2013 |
| CN | 203275846 U | 11/2013 |

OTHER PUBLICATIONS

International Search Report for International Application No. PCT/CN2013/090080 issued Feb. 26, 2014, 16pgs.

\* cited by examiner

DISPLAY DEVICE AND SWITCHING METHOD OF ITS DISPLAY MODES

CROSS-REFERENCE TO RELATED APPLICATIONS

This application is based on International Application No. PCT/CN2013/090080 filed on Dec. 20, 2013, which claims priority to Chinese National Application No. 201310213502.8 filed on May 31, 2013. The entire contents of each and every foregoing application are incorporated herein by reference.

TECHNICAL FIELD

Embodiments of the present invention relate to a display device and a switching method of its display modes.

BACKGROUND

In the display technology field, display modes of a display device at least comprises a two dimensional (2D) display mode, a three dimensional (3D) display mode and a double vision display mode depending on its functional classification.

With the 3D display mode, the stereoscopic effect is realized by making left and right eyes of a viewer to respectively receive different images utilizing the interocular distance of about 60 mm between the two eyes.

At present, a naked eye 3D display in the 3D display technology has been paid much attention. Referring to FIG. 1, a display device for the naked eye 3D display can split light emitted from the display device 200 by means of a parallax barrier or a lenticular lens such that light emitted from left eye pixels travels to the left eye of the viewer, while light from right eye pixels travels to the right eye, hence realizing the 3D display effect.

Double vision display technology refers to the technology by which different two dimensional (2D) images may be seen in viewing fields at two sides of the display device. Referring to FIG. 2, viewing regions of the double vision display comprise a left viewing region, a middle crosstalk region and a right viewing region. A viewer at a left side of the display device 200 can only see a part of pixels of the display device 200 via a slit grating 300; while a viewer at a right side of the display device 200 can only see another part of the pixels of the display device 200 via the slit grating 300. Inputting signals for different images into the pixels that can be seen by a left viewer and pixels that can be seen by a right viewer can realize the double vision effect.

At present, a display device that can switch among the 2D mode, the 3D mode and the double vision display mode is needed.

SUMMARY

Embodiments of the present invention provide a display device and a switching of its display modes that can switch among a 2D display mode, a 3D display mode and a double vision display mode.

In one aspect, embodiments of the present invention provide a display device, comprising: a display panel, configured to display an image; a slit grating, on a light exiting side of the display panel; and a liquid crystal lens, on a light exiting side of the slit grating to realize three effects of a concave lens effect, a convex lens effect and a flat light-transmitting glass effect.

In another aspect, embodiments of the present invention provide a switching method of display modes of the above-mentioned display device, comprising: in a condition that the display device is in a 3D display, inputting a left eye image into left eye pixels of the display panel and a right eye image into right eye pixels of the display panel; at the same time, controlling the liquid crystal lens to realize a flat light-transmitting glass effect, such that light emitted from the left eye image and the right eye image of the display panel enters a left eye viewing region and a right eye viewing region respectively after passing through the slit grating and the liquid crystal lens; and in a condition that the display device is in a double vision display, inputting a first image into pixels of the display panel corresponding to a first viewing region, and inputting a second image into pixels of the display panel corresponding to a second viewing region; controlling the liquid crystal lens to realize the effect of a plurality of concave lenses such that light emitted from the first image and the second image of the display panel enters the first viewing region and the second viewing region respectively after passing through the slit grating and the liquid crystal lens.

In yet another aspect, embodiments of the present invention further provide a switching method of display modes of the above-mentioned display device, comprising:

in a condition that the display device is in a 3D display, inputting a left eye image into left eye pixels of the display panel and a right eye image into right eye pixels of the display panel; controlling the liquid crystal lens to realize the effect of a plurality of convex lenses such that light emitted from the left eye pixels and the right eye pixels of the display panel enters a left eye viewing region and a right eye viewing region respectively after passing through the slit grating and the liquid crystal lens; and in a condition that the display device is in a double vision display, inputting a first image into pixels of the display panel corresponding to a first viewing region, and inputting a second image into pixels of the display panel corresponding to a second viewing region; controlling the liquid crystal lens to realize the flat light-transmitting glass effect such that light emitted from the first image and the second image of the display panel enters the first viewing region and the second viewing region respectively after passing through the slit grating and the liquid crystal lens.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the present invention provide a display device and a switching method of its display modes that can switch among a 2D display mode, a 3D display mode and a double vision display mode.

First of all, differences between 3D display and double vision display will be explained. For the double vision display, a double image display may be realized by viewing images displayed in first and second viewing regions of a double vision display device, and for example, the first and second viewing regions correspond to left and right viewing regions respectively. For the 3D display, the viewing regions of a 3D display device are a plurality of left eye viewing regions and right eye viewing regions arranged alternately. Both the double vision display and the 3D display can be realized by a display panel and a slit grating or a liquid crystal lens at a light exiting side of the display panel. Exemplarily, it may be realized by the slit grating or the liquid crystal lens for the double vision display disposed on the light exiting side of the display panel.

Embodiments of the present invention implement switching between 3D and double vision display or among 2D, 3D and double vision display by providing a slit grating or a liquid crystal lens on a light exiting side of a display panel.

The display device provided in embodiments of the present invention will be described in detail below with reference to the accompanying drawings.

Figure 1:
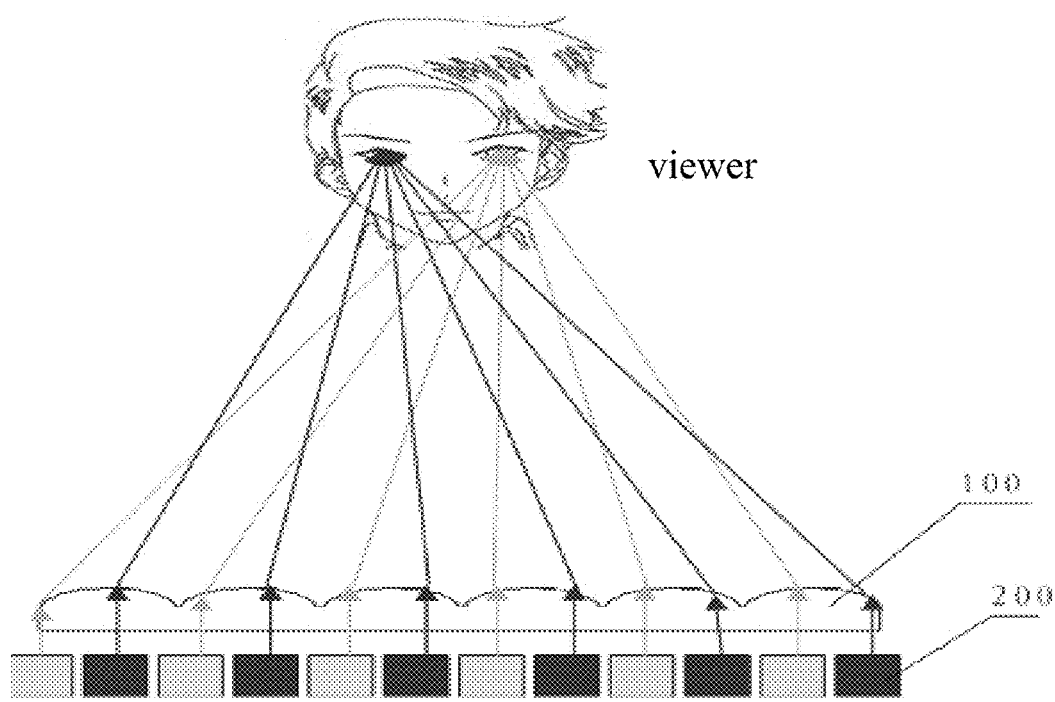
FIG. 1 is a principle view of a 3D displaying in prior art.
Figure 2:
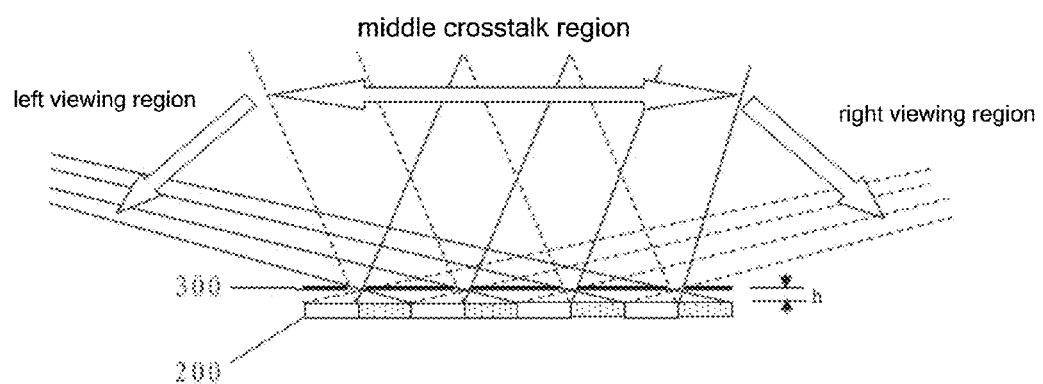
FIG. 2 is a principle view of a double vision displaying in prior art.
Figure 3:
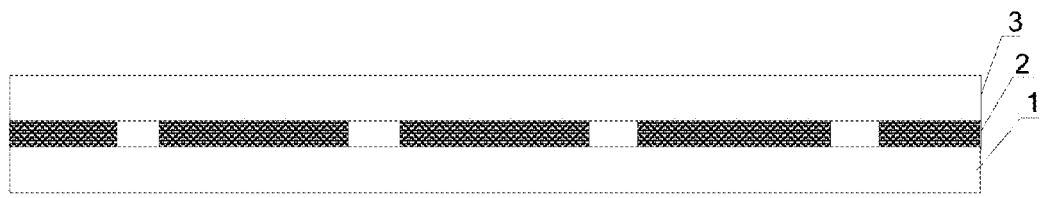
FIG. 3 is a structural schematic view of a display device according to an embodiment of the present invention.

As shown in FIG. 3, the display device provided in embodiments of the present invention comprises:

a display panel 1;

a slit grating 2, located on a light exiting side of the display panel 1;

a liquid crystal lens 3, located on a light exiting side of slit grating 2.

Herein, the slit grating comprises two types, that is, the slit grating may enable the display device to form the 3D effect or enable the display device to form the double vision effect.

The liquid crystal lens may equivalently realize concave lens effect, convex lens effect or flat transparent glass effect.

The liquid crystal lens is controlled to equivalently realize the concave lens effect, the convex lens effect or the flat transparent glass effect according to the type of slit grating to implement switching between 3D and double vision display or switching among 2D, 3D and double vision display.

It is to be noted that when the liquid crystal lens equivalently realizes the flat transparent glass effect, it does not change a propagation direction of light and its function is the same as that of a flat light-transmitting glass; and when the liquid crystal lens equivalently realizes the concave lens effect, it functions to diverge light, and when it equivalently realizes the convex lens effect, it functions to converge light.

The display device will be described in detail below with respect to embodiments.

A First Embodiment

Referring to FIG. 3, a display device according to the first embodiment of the present invention comprises:

a display panel 1;

a slit grating 2, located on a light exiting side of the display panel 1;

a liquid crystal lens 3, located on a light exiting side of the slit grating 2 and configured to realize three effects of concave lens, convex lens and flat light-transmitting glass effects.

The slit grating may enable the display device to realize 3D effect. The liquid crystal lens realizes the concave lens effect when the display device is in the double vision display, guides a first image and a second image emitted from the display panel and passing through the slit grating to a first viewing region and a second viewing region respectively, and the liquid crystal lens realizes the flat light-transmitting glass effect when the display device is in the 3D display, transmits a left eye image and a right eye image split by the slit grating.

Exemplarily, a switching method for the display device according to the first embodiment between 3D and double vision display comprises:

When the display device is in the 3D display, inputting a left eye image into left eye pixels of the display panel and inputting a right eye image into right eye pixels of the display panel; at the same time, controlling the liquid crystal lens on the light exiting side of the slit grating to realize the flat light-transmitting glass effect, such that light emitted from the left eye images and the right eye images of the display panel enters a left eye viewing region and a right eye viewing region respectively via the slit grating and the liquid crystal lens and a viewer can see a display picture with the 3D effect when his or her left eye and right eye are in left eye viewing region and right eye viewing region respectively, hence realizing the 3D display.

When the display device is the double vision display, inputting a first image into pixels corresponding to a first viewing region of the display panel and inputting a second image into pixels corresponding to a second viewing region of the display panel; controlling the liquid crystal lens to realize effect of a plurality of concave lenses, such that light emitted from the first image and the second image of the display panel enters the first viewing region and the second viewing region respectively via the slit grating and the liquid crystal lens, and a viewer in the first viewing region can see the first image and a viewer in the second viewing region can see the second image, hence realizing the double vision display.

Exemplarily, the slit grating may be an active parallax barrier or a passive parallax barrier.

When the slit grating is the passive parallax barrier, the parallax barrier comprises light-transmitting regions and light-shielding regions with a fixed slit pattern.

For the display device with the passive parallax barrier, in a process of switching between the 3D and the double vision display modes, it is only required to control the liquid crystal lens to realize different effects, for example, when realizing the 3D display, control the liquid crystal lens to realize the flat light-transmitting glass; when realizing the double vision display, control the liquid crystal lens to realize the concave lens effect. The display device with the passive parallax barrier can switch between 3D and double vision display.

When the slit grating is the active parallax barrier, the parallax barrier may be implemented by means of a liquid crystal grating or an electrochromic device. When the parallax barrier is the liquid crystal grating, slit-like light-transmitting regions and light-shielding regions that can realize the 3D display are formed by arranging liquid crystal molecules in different modes or the flat light-transmitting glass is realized.

Exemplarily, the above-mentioned electrochromic device will be described briefly below.

A device made of electrochromic material is called the electrochromic device. The electrochromic device provided in the embodiments of the present invention comprises electrodes and the electrochromic material above the electrodes. The electrochromism is a phenomenon in which the electrochromic material is subjected to a stable and reversible color change in optical properties (reflectivity, transmittance, absorbance and the like) when electrodes are energized and in the appearance, a reversible change of color and transparency is shown.

The electrochromic device provided in embodiments of the present invention comprises a plurality of electrodes parallel to each other having electrochromic material disposed thereon and intervals with a set width therebetween. The intervals are light-transmitting regions. When applying voltages to the electrodes, the electrochromic material on the electrodes undergoes increase of light reflectivity and absorptivity and decrease of light transmittance and exhibits as black in the appearance; now, light-shielding regions above the electrodes and light-transmitting regions between adjacent electrodes function as a slit grating. When the electrodes are not energized, the electrochromic material undergoes decrease of light reflectivity and absorptivity and increase of light transmittance and exhibits the flat light-transmitting glass effect in the appearance.

For the display device with the active parallax barrier, in a process of switching between 3D and double vision display, it is required to control both the liquid crystal grating and the liquid crystal lens to realize different effects, for example, when realizing the 3D display, control the liquid crystal grating to form slit-like light-transmitting regions and light-shielding regions that can realize the 3D display and control the liquid crystal lens to realize the flat light-transmitting glass effect; when realizing the double vision display, control the liquid crystal lens to realize the concave lens effect. In a process of realizing the 2D display, the liquid crystal grating and the liquid crystal lens are respectively controlled to realize the flat light-transmitting glass effect.

The display device with the active parallax barrier can be switched between 2D, 3D and double vision display.

Figure 4:
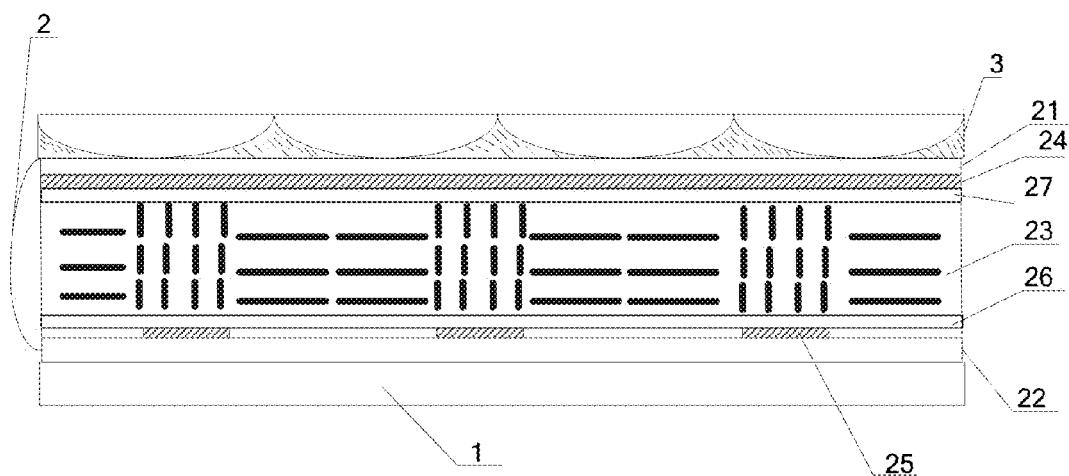
FIG. 4 is a structural schematic view of another display device according to an embodiment of the present invention.

The slit grating in the display device shown in FIG. 3 is the passive parallax barrier, the slit grating shown in FIG. 4 is the active parallax barrier.

The display device shown in FIG. 4 will be explained with respect to an example in which the active parallax barrier is a liquid crystal grating.

As shown in FIG. 4, the liquid crystal grating 2 comprises: an upper substrate 21 and a lower substrate 22, disposed to face each other, a liquid crystal layer 23 between the upper substrate 21 and the lower substrate 22, a first transparent electrode 24 on a side of the upper substrate 21 close to the liquid crystal layer 23 and a second transparent electrode 25 on a side of the lower substrate 22 close to the liquid crystal layer 23.

Furthermore, the liquid crystal grating 2 further comprises an upper alignment film 27 and a lower alignment film 26 on both sides of the liquid crystal layer 23.

The first transparent electrode is a plate electrode, the second transparent electrode comprises a plurality of strip-shaped electrodes disposed parallel to each other and with equal intervals therebetween. Alternatively, the second transparent electrode is a plate electrode, the first transparent electrode comprises a plurality of strip-shaped electrodes disposed parallel with each other and with equal intervals therebetween.

The liquid crystal grating provided in the embodiments of the present invention is a normal white liquid crystal grating.

By applying voltages to the first transparent electrode (the plate electrode) and the second transparent electrode (the strip-shaped electrode), the liquid crystal molecules near the second transparent electrode are deflected, regions corresponding to the second transparent electrode are light-shielding regions (or light-transmitting regions), other regions are light-transmitting regions (or light-shielding regions); and the liquid crystal grating forms slit-like light-transmitting regions and light-shielding regions, forming the liquid crystal grating that can realize the 3D display. When the first transparent electrode and the second transparent electrode are not energized, the liquid crystal grating does not change a propagation direction of the light transmitted through it and functions as a flat light-transmitting glass.

The liquid crystal grating further comprises polarizers on the upper substrate and the lower substrate and having optical axes being perpendicular to or parallel with each other. When the display panel of the display device is a liquid crystal display panel, an upper polarizer and a lower polarizer may be respectively disposed on an upper substrate and a lower substrate of the liquid crystal display panel; the upper polarizer of the liquid crystal display panel and a lower polarizer of the liquid crystal grating may be the same one, that is, the liquid crystal display panel and the liquid crystal grating share one of these polarizers.

A Second Embodiment

Referring to FIG. 3, a display device according to the second embodiment comprises:

a display panel 1;

a slit grating 2, located on a light exiting side of the display panel 1;

a liquid crystal lens 3, located on a light exiting side of the slit grating 2.

The slit grating may enable the display device to realize the double vision effect; the liquid crystal lens equivalently realizes flat light-transmitting glass effect when the display device is in the double vision display, transmits a first image and a second image emitted from the display panel and passing through the slit grating; and the liquid crystal lens realizes convex lens effect when the display device is in the 3D display, guides a left eye image and a right eye images split by the slit grating into a left eye viewing region and a right eye viewing region respectively.

Exemplarily, a switching method of the display device according to the second embodiment between 3D display mode and double vision display mode comprises:

When the display device is in the 3D display, inputting a left eye image into left eye pixels of the display panel and inputting a right eye image into right eye pixels of the display panel; controlling the liquid crystal lens to realize the effect of a plurality of convex lenses, such that light emitted from the left eye image and the right eye image of the display panel enters a left eye viewing region and a right eye viewing region respectively via the slit grating and the liquid crystal lens;

When the display device is in the double vision display, inputting a first image into pixels corresponding to the first viewing region of the display panel and inputting a second image into pixels corresponding to the second viewing region of the display panel; controlling the liquid crystal lens to realize the flat light-transmitting glass effect, such that light emitted from the first image and the second image of the display panel enters the first viewing region and the second viewing region respectively via the slit grating and the liquid crystal lens.

Exemplarily, the slit grating is similar to the slit grating provided in the first embodiment.

The slit grating capable of achieving the double vision effect may be an active parallax barrier and a passive parallax barrier.

The difference from the active parallax barrier and passive parallax barrier provided in the first embodiment is that the arrangement of slits of the parallax barrier can guarantee light passing through the parallax barrier be more divergent, thereby forming a first viewing region and a second viewing region on the light exiting side of the display device, which is not described here.

For a display device with the passive parallax barrier, in a process of realizing switching between 3D and double vision display, it is only required to control the liquid crystal lens to realize different effects. For example, when being in the 3D display, the liquid crystal lens is controlled to realize the convex lens effect; and when being in the double vision display, the liquid crystal lens is controlled to realize the flat light-transmitting glass effect. The display device with the passive parallax barrier can be switched between 3D and double vision display.

When the slit grating is the active parallax barrier, the parallax barrier is a liquid crystal grating, slit-like light-transmitting regions and light-shielding regions that can realize double vision display are formed by aligning liquid crystal molecules in different modes or the flat light-transmitting glass effect is realized.

For the display device with the active parallax barrier, in a process of switching between 3D and double vision display, it is required to control both the liquid crystal grating and the liquid crystal lens to realize different effects, for example, when being in the 3D display, the liquid crystal lens is controlled to realize the convex lens effect. When being in the double vision display, the liquid crystal lens is controlled to realize the flat light-transmitting glass effect. In a process of realizing the 2D display, the liquid crystal grating and the liquid crystal lens are respectively controlled to realize the flat light-transmitting glass effect.

The display device with the passive parallax barrier in the second embodiment can be switched between 3D and double vision display.

The display device with the active parallax barrier can be switched between 2D, 3D and double vision display.

Exemplarily, two implementations of the liquid crystal lens provided in the first embodiment and the second embodiment will be described below. The liquid crystal lens may be embodied in various modes. The two exemplary modes of the liquid crystal lens described below are only for explaining an embodiment of the present invention rather than limitation.

A First Mode

Figure 5:
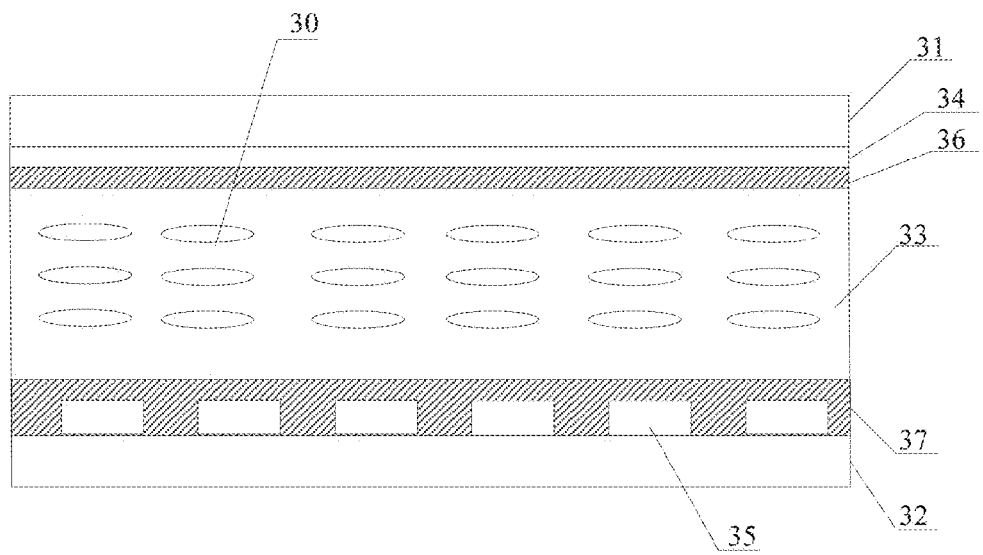
FIG. 5 is a structural schematic view of a liquid crystal lens of a first mode according to an embodiment of the present invention.

Exemplarily, as shown in FIG. 5, the liquid crystal lens comprises:

an upper substrate 31 and a lower substrate 32, disposed to face each other;

a liquid crystal layer 33, disposed between the upper substrate 31 and the lower substrate 32;

a first transparent electrode 34 on a side of the upper substrate 31 close to the liquid crystal layer 33 and a second transparent electrode 35 on a side of the lower substrate 32 close to the liquid crystal layer 33;

a first alignment film 36 on a side of the first transparent electrode 34 close to the liquid crystal layer 33, and a second alignment film 37 on a side of the second transparent electrode 35 close to the liquid crystal layer 33.

Exemplarily, the first transparent electrode is a plate electrode and the second transparent electrode comprises a plurality of strip-shaped electrodes. Alternatively, the first transparent electrode comprises a plurality of strip-shaped electrodes and the second transparent electrode is a plate electrode.

Applying voltages to the first transparent electrode and the second transparent electrode in the liquid crystal lens in different ways equivalently realize different lens with different structures.

No voltage is applied between the first transparent electrode and the second transparent electrode in the liquid crystal lens shown in FIG. 5, liquid crystal molecules in the liquid crystal lens align along a direction of the alignment film and the liquid crystal lens does not change a propagation direction of the light, hence functioning as a flat light-transmitting glass.

Figure 6:
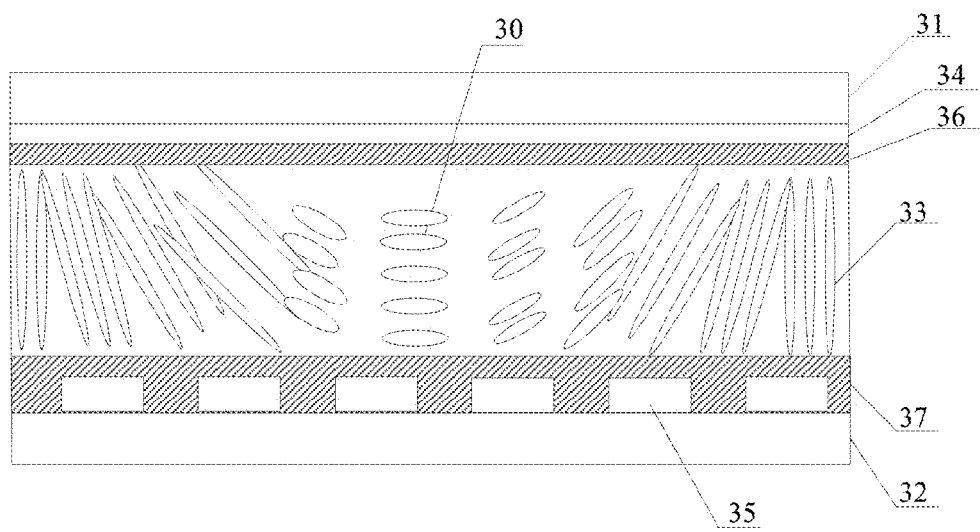
FIG. 6 is a structural schematic view of a liquid crystal lens of the first mode according to an embodiment of the present invention.

When a constant voltage is applied to the first transparent electrode, a small voltage is applied to the second transparent electrode distributed in a middle region, and a large voltage is applied to the second transparent electrode distributed in two side-regions, electric field lines in the middle region are relatively sparse, electric field lines in two side-regions are relatively dense, liquid crystal molecules align along a direction of the electric field lines, and the liquid crystal lens equivalently realizes the concave lens effect as shown in FIG. 6.

Figure 7:
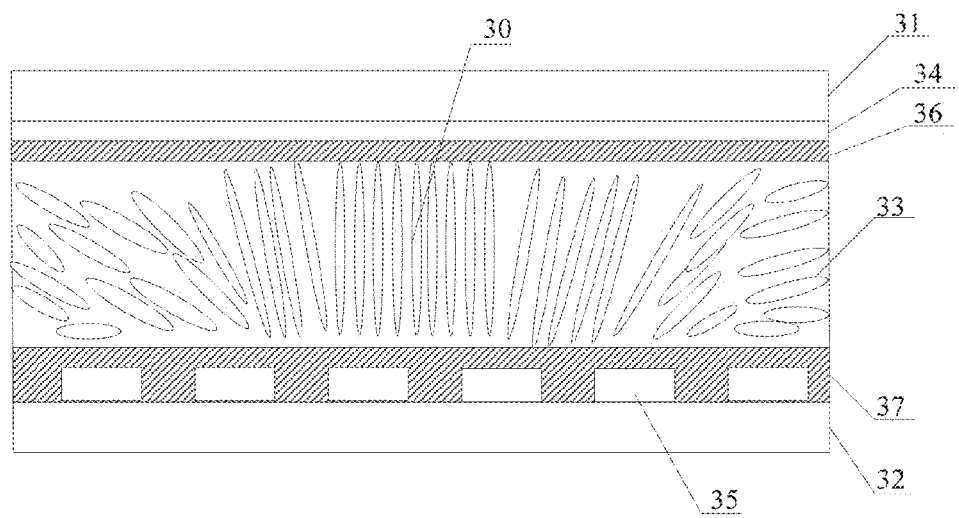
FIG. 7 is a structural schematic view of a liquid crystal lens of the first mode according to an embodiment of the present invention.

In a condition that a large voltage is applied to the electrodes distributed in the middle region, and a small voltage is applied to the electrodes distributed in the two side-regions, electric field lines in the middle region are relatively dense, and electric field lines in the two side-regions are relatively sparse, therefore the liquid crystal lens equivalently realizes the convex lens effect as shown in FIG. 7.

The liquid crystal lens shown in FIGS. 6 and 7 only shows one concave lens structure and one convex lens structure respectively. In the embodiments, the liquid crystal lens shown in FIG. 6 comprises a plurality of adjacent concave lenses, and the liquid crystal lens shown in FIG. 7 comprises a plurality of adjacent convex lenses.

Figure 8:
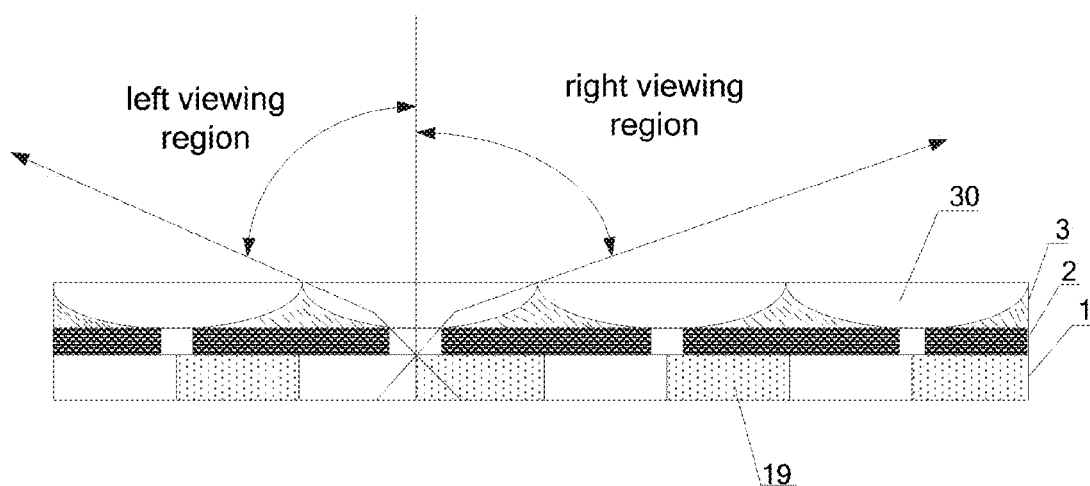
FIG. 8 is a simple principle view of a display device according to an embodiment of the present invention in a double vision display.

As shown in FIG. 8, the liquid crystal lens comprises a plurality of lens units 30 each corresponding to one concave lens structure or one convex lens structure, and the display device shown in FIG. 8 comprises a plurality of lens units 30.

Description will be given with respect to an example in which the lens unit 30 is the concave lens structure shown in FIG. 6. Each lens unit 30 is configured to direct light from the display panel 1 that corresponds to the first image to a left viewing field (or a right viewing field), and direct light from the display panel 1 that corresponds to the second image to the right viewing field (or the left viewing field). Arrowed lines in FIG. 8 denote light. As can be seen from FIG. 8, each lens unit 30 can enlarge a projection scope of light emitted from a pixel corresponding thereto and the lens units 30 enlarge as a whole the first viewing region and the second viewing region of the display device. The crosstalk region is reduced and the double visual field display effect is enhanced.

Exemplarily, as shown in FIG. 8, one pixel unit in the display panel 1 comprises three sub-pixel units 19, for example, red, green and blue sub-pixel units. Exemplarily, each lens unit 30 in the liquid crystal lens of the first embodiment and the second embodiment corresponds to two adjacent columns of sub-pixel units 19 in the display panel 1. When being in the double vision display, one column of sub-pixel units displays an image A and the other column of sub-pixel units displays an image B. After the image A and the image B pass through the liquid crystal lens that diverges light, respective viewing regions of the two images are separated apart and a distance between viewing regions is relatively large. Of course, it is also possible for n columns of the sub-pixel to be as one cycle for alternately displaying the image A and the image B, which will not be limited specifically here.

A Second Mode

Figure 9:
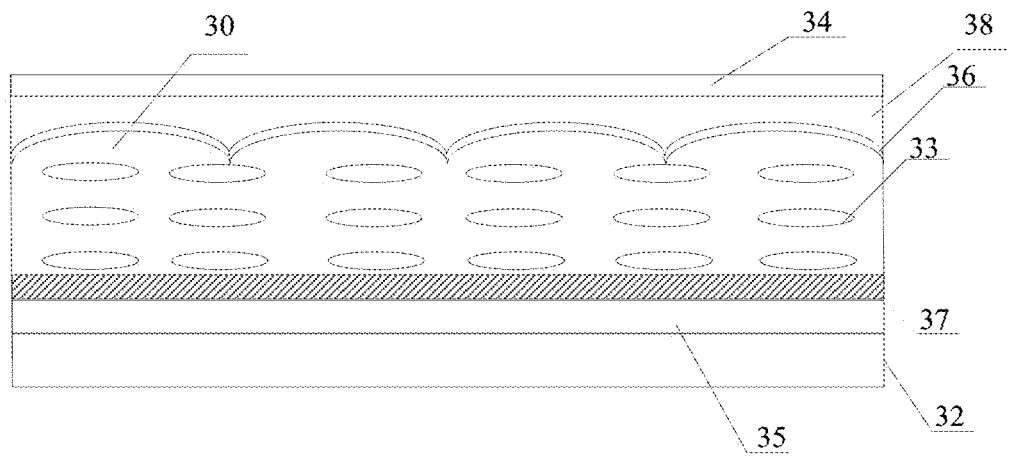
FIG. 9 is a structural schematic view of a liquid crystal lens of a second mode according to an embodiment of the present invention.

Exemplarily, as shown in FIG. 9, the liquid crystal lens comprises:

a lower substrate 32;

a concave lens 38, disposed to face the lower substrate 32 and comprising a plurality of lens units 30, which has a concave side close to a liquid crystal layer 33 between the lower substrate 32 and the concave lens 38;

a first transparent electrode 34 on a side of the concave lens 38 apart from the liquid crystal layer 33 and a second transparent electrode 35 on a side of the lower substrate 32 close to the liquid crystal layer 33;

a first alignment film 36 on the concave side of the concave lens 38 and a second alignment film 37 on a side of the second transparent electrode 35 close to the liquid crystal layer 33.

The first transparent electrode 34 and the second transparent electrode 35 are plate electrodes.

Exemplarily, assuming a polarization direction of a polarized light passing through the liquid crystal lens is a first direction with respect to the lower substrate (for example, a direction parallel with the paper), the refractive index in a long axis of liquid crystal molecules in the liquid crystal layer equals to the refractive index of material of the concave lens; when no voltage is applied to the first transparent electrode 34 and the second transparent electrode 35, as shown in FIG. 9, the liquid crystal molecules align horizontally with respect to the lower substrate 32, that is, a long axis direction of liquid crystal molecules is parallel with the first direction, the refractive index of light in the long axis direction of liquid crystal molecules is n, and the refractive index of the concave lens 38 is also n. When the polarized light transmitting through the liquid crystal lens passes the liquid crystal layer and the concave lens with the identical refractive index, a propagation direction of light does not change. Now the liquid crystal lens functions as a flat glass and light can be transmitted to a light exiting side of the liquid crystal lens.

Figure 10:
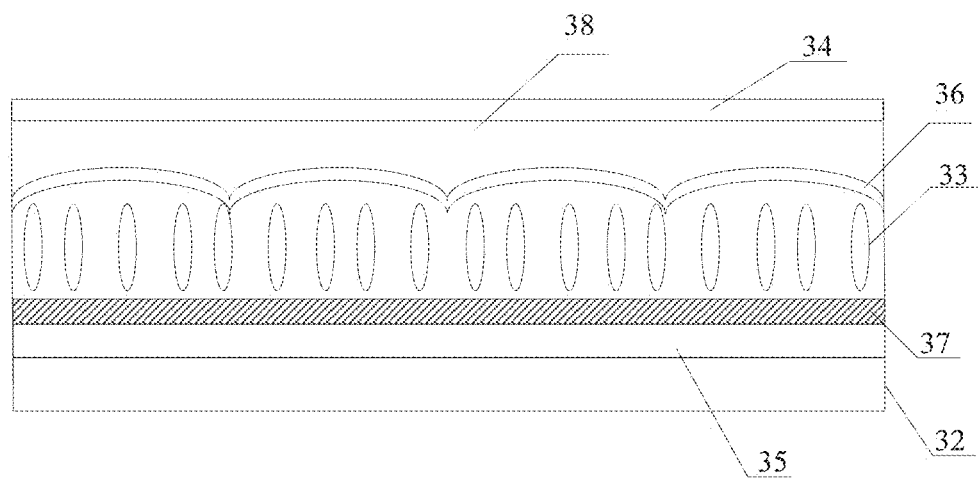
FIG. 10 is a structural schematic view of a liquid crystal lens of the second mode provided according to an embodiment of the present invention.

Referring to FIG. 10, when applying a certain voltage to the first transparent electrode 34 and the second transparent electrode 35 respectively, the liquid crystal molecules align perpendicularly to the lower substrate 32 under the action of a perpendicular electric field generated between the first transparent electrode 34 and the second transparent electrode 35, that is, a minor axis direction of the liquid crystal molecules is parallel with the first direction. Now the refractive index of liquid crystal molecules in the first direction is n1, and the refractive index of the concave lens 38 is n, n>n1, and the liquid crystal lens realizes the concave lens effect and is equivalent to a concave lens. Light of the display panel having a certain incident angle, after passing through the liquid crystal lens, has a larger exiting angle and the left viewing field and the right viewing field both become larger accordingly.

Of course, the structures of the slit grating and the liquid crystal lens in the display device provided in the embodiments of the present invention are not limited to the above-mentioned structures, and any slit grating that can realize 3D effect and any liquid crystal lens that can realize the concave lens effect may be applied to the display device described in first embodiment. Any slit grating that can realize double vision effect and any liquid crystal lens that can realize the convex lens effect may be applied to the display device described in the second embodiment.

It is to be noted that the display panel in the display device provided in the embodiments of the present invention may be any structure that can display an image. For example, the display panel may be a liquid crystal display panel, or may be a plasma display and a cathode-ray display and the like.

It is to be noted that for the display device provided in the embodiments of the present invention, when the slit grating is the liquid crystal grating, and the display panel is a liquid crystal display panel, an upper polarizer and a lower polarizer are respectively disposed on an upper substrate and a lower substrate of the liquid crystal grating; and an upper polarizer and a lower polarizer may be also respectively disposed on an upper substrate and a lower substrate of the liquid crystal panel; the upper polarizer of the liquid crystal display panel and the lower polarizer of the liquid crystal grating may be the same one, that is, the liquid crystal display panel and the liquid crystal grating share one of these polarizers.

When the display panel is a plasma display panel and a cathode-ray display panel, the upper polarizer and the lower polarizer are only disposed on the upper substrate and the lower substrate of the liquid crystal grating of the display device respectively.

Embodiments of the present invention provide a display device that can be switched between 3D display and double vision display modes, the display device comprises a display panel, a slit grating on a light exiting side of the display panel and a liquid crystal lens on a light exiting side of the slit grating. Exemplarily, the slit grating can enable the display device to realize 3D effect. The liquid crystal lens realizes concave lens effect when the display device is in the double vision display, directs a first image and a second image emitted from the display panel and passing through the slit grating to a first viewing region and a second viewing region respectively. The liquid crystal lens realizes the flat light-transmitting glass effect when the display device is in the 3D display, transmits a left eye image and a right eye image split by the slit grating. When the display device is in the 3D display, a left eye image is input into left eye pixels of the display panel and a right eye image is input into right eye pixels of the display panel, and at the same time, the liquid crystal lens is controlled to realize the flat light-transmitting glass effect, light emitted from the left eye image and the right eye image of the display panel enters the left eye viewing region and the right eye viewing region after passing through the slit grating and the liquid crystal lens. When the display device is in the double vision display, a first image is input into pixels of the display panel corresponding to a first viewing region, and a second image is input into pixels of the display panel corresponding to a second viewing region, the liquid crystal lens is controlled to realize the effect of a plurality of concave lens, light emitted by the first image and the second image of the display panel enters the first viewing region and the second viewing region respectively after passing through the slit grating and the liquid crystal lens. Thus, the display device that can be switched between 3D and double vision display modes is realized.

The embodiment of the invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

The invention claimed is:

1. A display device, comprising:
a display panel, configured to display an image;
a slit grating, on a light exiting side of the display panel; and
a liquid crystal lens, on a light exiting side of the slit grating to realize three effects of a concave lens effect, a convex lens effect and a flat light-transmitting glass effect;
wherein the liquid crystal lens realizes the concave lens effect in a condition that the display device is in a double vision display, directs a first image and a second image emitted from the display panel and passing through the slit grating to a first viewing region and a second viewing region respectively; the liquid crystal lens realizes the flat light-transmitting glass effect in a condition that the display device is in a 3D display, transmits a left eye image and a right eye image split by the slit grating.

2. The display device of claim 1, wherein the slit grating is a passive parallax barrier comprising light-transmitting regions and light-shielding regions arranged alternately.

3. The display device of claim 1, wherein the slit grating is an active parallax barrier.

4. The display device of claim 3, wherein the active parallax barrier is a liquid crystal grating,
the liquid crystal grating is configured to comprise light-shielding regions and light-transmitting regions arranged alternately in a condition that the display device is in the 3D display,
the liquid crystal grating realizes the flat light-transmitting glass effect in a condition that the display device is in a 2D display.

5. The display device of claim 4, wherein the liquid crystal grating comprises:
an upper substrate and a lower substrate disposed oppositely;
a liquid crystal layer, interposed between the upper substrate and the lower substrate;
a first transparent electrode, on a side of the upper substrate close to the liquid crystal layer;
a second transparent electrode, on a side of the lower substrate close to the liquid crystal layer;
an upper alignment film and a lower alignment film, disposed on two sides of the liquid crystal layer respectively,
wherein the first transparent electrode is a plate electrode, the second transparent electrode comprises a plurality of strip-shaped electrodes disposed parallel with each other and with equal intervals.

6. The display device of claim 3, wherein the active parallax barrier is an electrochromic device, the electrochromic device comprising:
a plurality of electrodes disposed parallel with and spaced apart from each other, with intervals between any two adjacent electrodes; and
an electrochromic material above the plurality of electrodes.

7. The display device of claim 6, wherein the electrochromic device is configured to comprise light-shielding regions and light-transmitting regions arranged alternately in a condition that the display device is in the 3D display,
the electrochromic device realizes the flat light-transmitting glass effect in a condition that the display device is in the 2D display.

8. The display device of claim 1, wherein, in a condition that the display device is in a 2D display mode, the slit grating and the liquid crystal lens realize the flat light-transmitting glass effect at the same time.

9. The display device of claim 1, wherein the liquid crystal lens comprises:
an upper substrate and a lower substrate disposed oppositely;
a liquid crystal layer, between the upper substrate and the lower substrate;
a first transparent electrode, on a side of the upper substrate close to the liquid crystal layer;
a second transparent electrode, on a side of the lower substrate close to the liquid crystal layer;
a first alignment film, on a side of the first transparent electrode close to the liquid crystal layer; and
a second alignment film, on a side of the second transparent electrode close to the liquid crystal layer,
wherein the first transparent electrode is a plate electrode, the second transparent electrode comprises a plurality of strip-shaped electrodes; or, the first transparent electrode comprises a plurality of strip-shaped electrodes, and the second transparent electrode is a plate electrode.

10. The display device of claim 9, wherein the liquid crystal lens comprises a plurality of lens units each corresponding to two adjacent columns of sub-pixel units of the display panel.

11. The display device of claim 1, wherein the liquid crystal lens comprises:
a lower substrate;
a concave lens, disposed opposite the lower substrate and comprising a plurality of lens units;
a liquid crystal layer, disposed between the lower substrate and the concave lens with a concave side of the concave lens close to the liquid crystal layer;
a first transparent electrode, on a side of the concave lens apart from the liquid crystal layer;
a second transparent electrode, on a side of the lower substrate close to the liquid crystal layer;
a first alignment film, on the concave side of the concave lens; and
a second alignment film, on a side of the second transparent electrode close to the liquid crystal layer, wherein the first transparent electrode and the second transparent electrode are plate electrodes.

12. The display device of claim 11, wherein a refractive index in a long axis direction of liquid crystal molecules in the liquid crystal layer equals a refractive index of material forming the concave lens.

13. A switching method of display modes of the display device according to claim 1, comprising:
   in a condition that the display device is in a 3D display, inputting a left eye image into left eye pixels of the display panel and a right eye image into right eye pixels of the display panel; at the same time, controlling the liquid crystal lens to realize a flat light-transmitting glass effect, such that light emitted from the left eye image and the right eye image of the display panel enters a left eye viewing region and a right eye viewing region respectively after passing through the slit grating and the liquid crystal lens; and
   in a condition that the display device is in a double vision display, inputting a first image into pixels of the display panel corresponding to a first viewing region, and inputting a second image into pixels of the display panel corresponding to a second viewing region; controlling the liquid crystal lens to realize the effect of a plurality of concave lenses such that light emitted from the first image and the second image of the display panel enters the first viewing region and the second viewing region respectively after passing through the slit grating and the liquid crystal lens.

14. The switching method of claim 13, further comprises in a condition that the slit grating is a liquid crystal grating or an electrochromic device:
   in a condition that the display device is in a 2D display, controlling the liquid crystal grating and the liquid crystal lens to realize the flat light-transmitting glass effect respectively.

15. A switching method of display modes of the display device according to claim 1, comprising:
   in a condition that the display device is in a 3D display, inputting a left eye image into left eye pixels of the display panel and a right eye image into right eye pixels of the display panel; controlling the liquid crystal lens to realize the effect of a plurality of convex lenses such that light emitted from the left eye pixels and the right eye pixels of the display panel enters a left eye viewing region and a right eye viewing region respectively after passing through the slit grating and the liquid crystal lens; and
   in a condition that the display device is in a double vision display, inputting a first image into pixels of the display panel corresponding to a first viewing region, and inputting a second image into pixels of the display panel corresponding to a second viewing region; controlling the liquid crystal lens to realize the flat light-transmitting glass effect such that light emitted from the first image and the second image of the display panel enters the first viewing region and the second viewing region respectively after passing through the slit grating and the liquid crystal lens.

16. The switching method of claim 15, further comprises in a condition that the slit grating is a liquid crystal grating:
   in a condition that the display device is in a 2D display, controlling the liquid crystal grating and the liquid crystal lens to realize the flat light-transmitting glass effect respectively.

17. A display device, comprising:
   a display panel, configured to display an image;
   a slit grating, on a light exiting side of the display panel; and
   a liquid crystal lens, on a light exiting side of the slit grating to realize three effects of a concave lens effect, a convex lens effect and a flat light-transmitting glass effect;
   wherein the liquid crystal lens realizes the flat light-transmitting glass effect in a condition that the display device is in a double vision display, transmits a first image and a second image emitted by the display panel and passing through the slit grating; the liquid crystal lens realizes the convex lens effect when the display device is in a 3D display, directs a left eye image and a right eye image split by the slit grating to a left eye viewing region and a right eye viewing region respectively.

18. The display device of claim 17, wherein the slit grating is a passive parallax barrier comprising light-transmitting regions and light-shielding regions arranged alternately.

19. The display device of claim 17, wherein the slit grating is an active parallax barrier.

20. The display device of claim 19, wherein the active parallax barrier is a liquid crystal grating,
   the liquid crystal grating is configured to comprise light-shielding regions and light-transmitting regions arranged alternately in a condition that the display device is in the 3D display,
   the liquid crystal grating realizes the flat light-transmitting glass effect in a condition that the display device is in a 2D display.

21. The display device of claim 20, wherein the liquid crystal grating comprises:
   an upper substrate and a lower substrate disposed oppositely;
   a liquid crystal layer, interposed between the upper substrate and the lower substrate;
   a first transparent electrode, on a side of the upper substrate close to the liquid crystal layer;
   a second transparent electrode, on a side of the lower substrate close to the liquid crystal layer;
   an upper alignment film and a lower alignment film, disposed on two sides of the liquid crystal layer respectively,
   wherein the first transparent electrode is a plate electrode, the second transparent electrode comprises a plurality of strip-shaped electrodes disposed parallel with each other and with equal intervals.

22. The display device of claim 19, wherein the active parallax barrier is an electrochromic device, the electrochromic device comprising:
   a plurality of electrodes disposed parallel with and spaced apart from each other, with intervals between any two adjacent electrodes; and
   an electrochromic material above the plurality of electrodes.

23. The display device of claim 22, wherein the electrochromic device is configured to comprise light-shielding regions and light-transmitting regions arranged alternately in a condition that the display device is in the 3D display,
   the electrochromic device realizes the flat light-transmitting glass effect in a condition that the display device is in the 2D display.

24. The display device of claim 17, wherein in a condition that the display device is in a 2D display mode, the slit grating and the liquid crystal lens realize the flat light-transmitting glass effect at the same time.

25. display device of claim 17, wherein the liquid crystal lens comprises:
   an upper substrate and a lower substrate disposed oppositely;
   a liquid crystal layer, between the upper substrate and the lower substrate;
   a first transparent electrode, on a side of the upper substrate close to the liquid crystal layer;
   a second transparent electrode, on a side of the lower substrate close to the liquid crystal layer;
   a first alignment film, on a side of the first transparent electrode close to the liquid crystal layer; and
   a second alignment film, on a side of the second transparent electrode close to the liquid crystal layer,
   wherein the first transparent electrode is a plate electrode, the second transparent electrode comprises a plurality of strip-shaped electrodes; or, the first transparent electrode comprises a plurality of strip-shaped electrodes, and the second transparent electrode is a plate electrode.

26. The display device of claim 25, wherein the liquid crystal lens comprises a plurality of lens units each corresponding to two adjacent columns of sub-pixel units of the display panel.

27. The display device of claim 17, wherein the liquid crystal lens comprises:
   a lower substrate;
   a concave lens, disposed opposite the lower substrate and comprising a plurality of lens units;
   a liquid crystal layer, disposed between the lower substrate and the concave lens with a concave side of the concave lens close to the liquid crystal layer;
   a first transparent electrode, on a side of the concave lens apart from the liquid crystal layer;
   a second transparent electrode, on a side of the lower substrate close to the liquid crystal layer;
   a first alignment film, on the concave side of the concave lens; and
   a second alignment film, on a side of the second transparent electrode close to the liquid crystal layer, wherein the first transparent electrode and the second transparent electrode are plate electrodes.

28. The display device of claim 27, wherein a refractive index in a long axis direction of liquid crystal molecules in the liquid crystal layer equals a refractive index of material forming the concave lens.

* * * * *